United States Patent
Niu et al.

(10) Patent No.: US 7,627,059 B2
(45) Date of Patent: Dec. 1, 2009

(54) METHOD OF ROBUST TIMING DETECTION AND CARRIER FREQUENCY OFFSET ESTIMATION FOR OFDM SYSTEMS

(75) Inventors: Huaning Niu, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 551 days.

(21) Appl. No.: 11/100,239

(22) Filed: Apr. 5, 2005

(65) Prior Publication Data
US 2006/0222095 A1 Oct. 5, 2006

(51) Int. Cl.
*H04L 27/00* (2006.01)
(52) U.S. Cl. .............. 375/324; 375/295; 375/303; 375/142
(58) Field of Classification Search ......... 375/150, 375/243, 254, 260, 287, 324, 343–344, 346, 375/348, 135–137, 365, 142, 295, 326, 303, 375/366
See application file for complete search history.

(56) References Cited

U.S. PATENT DOCUMENTS

| | | | |
|---|---|---|---|
| 6,421,553 B1 | 7/2002 | Costa et al. | |
| 6,629,041 B1 | 9/2003 | Marbach | |
| 7,130,461 B2 | 10/2006 | Rosenholtz | |
| 7,177,446 B2 | 2/2007 | Magarey | |
| 7,197,690 B2 | 3/2007 | Shen et al. | |
| 7,231,007 B2 | 6/2007 | Artamo et al. | |
| 7,295,624 B2 | 11/2007 | Onggosanusi et al. | |
| 7,298,772 B1* | 11/2007 | Neerudu et al. | 375/136 |
| 7,308,026 B2 | 12/2007 | Purho | |
| 7,313,172 B2 | 12/2007 | Pan et al. | |
| 7,315,566 B2* | 1/2008 | Tanno et al. | 375/142 |
| 7,315,576 B1 | 1/2008 | van Nee et al. | |
| 7,352,909 B2 | 4/2008 | Guleryuz | |
| 7,382,827 B2 | 6/2008 | Yousef et al. | |
| 7,397,826 B2 | 7/2008 | Gorokhov | |
| 7,447,277 B2* | 11/2008 | Yajima et al. | 375/326 |
| 7,480,234 B1* | 1/2009 | Hart et al. | 370/208 |
| 2003/0063654 A1 | 4/2003 | Onggosanusi et al. | |
| 2004/0005022 A1* | 1/2004 | Zhu et al. | 375/365 |
| 2004/0170237 A1* | 9/2004 | Chadha et al. | 375/343 |
| 2004/0223480 A1 | 11/2004 | Nguyen et al. | |
| 2005/0163238 A1* | 7/2005 | Fujii | 375/260 |
| 2005/0163265 A1* | 7/2005 | Gupta | 375/343 |
| 2005/0220175 A1* | 10/2005 | Zhou | 375/141 |

(Continued)

OTHER PUBLICATIONS

Byungjoon Park et al. "A Novel Timing Estimation Method for OFDM Systems" IEEE Communications Letters, vol. 7, No. 5; May 2003; pp. 239-241.*

(Continued)

*Primary Examiner*—Shuwang Liu
*Assistant Examiner*—Hirdepal Singh
(74) *Attorney, Agent, or Firm*—Kenneth L. Sherman, Esq.; Michael Zarrabian, Esq.; Myers Andras Sherman LLP (57) ABSTRACT

A symbol detector for an OFDM receiver determines the correlation of corresponding samples of at least two received preamble symbol samples, one of the samples delayed a predetermined duration with respect to the other; determines a timing metric based on the correlation results; detects multiple peaks in the timing metric; indicates a symbol detection based on the multiple peaks detected in the timing metric; and gets a refined CFO estimation using averaging the phase information across these multiple peaks.

23 Claims, 5 Drawing Sheets

802.11a preamble structure

U.S. PATENT DOCUMENTS

| | | | |
|---|---|---|---|
| 2005/0265467 | A1 | 12/2005 | Dabak et al. |
| 2006/0062283 | A1 | 3/2006 | Zhang et al. |
| 2006/0092902 | A1 | 5/2006 | Schmidt |
| 2006/0105767 | A1 | 5/2006 | Kim |
| 2006/0146962 | A1* | 7/2006 | Troya et al. ............ 375/340 |
| 2006/0227903 | A1 | 10/2006 | Niu et al. |
| 2007/0092110 | A1 | 4/2007 | Xu et al. |
| 2007/0127603 | A1 | 6/2007 | Niu et al. |

OTHER PUBLICATIONS

T.M. Schmidl and D.C. Cox, "Robust frequency and timing synchronization for OFDM," IEEE Transactions On Communications, Dec. 1997, pp. 1613-1621, vol. 45, No. 12.

H. Minn, M. Zeng and V.K. Bhargava, "On timing offset estimation for OFDM systems," IEEE Communications Letters, Jul. 2000, pp. 242-244, vol. 4, No. 7.

J. Li, G. Liu and G.B. Giannakis, "Carrier frequency offset estimation for OFDM-Based WLANs," IEEE Signal Processing Letters, Mar. 2001, pp. 80-82, vol. 8, No. 3.

G.D. Golden, C.J. Foschini, R.A. Valenzuela and P.W. Wolniansky, "Detection algorithm and initial laboratory results using V-Blast space-time communication architecture," Electronics Letters, pp. 14-16, vol. 35, No. 1.

E. Zehavi, "8-PSK trellis codes for a Rayleigh channel", IEEE Transactions on Communications, vol. 40, Issue 5, May 1992, pp. 873-884.

* cited by examiner

Fig. 1. 802.11a preamble structure

Fig. 2. Correlation system for timing detection and CFO estimation
Prior Art

Fig. 3 System for OFDM timing detection and CFO estimation

Fig. 4. Event counter flow chart

METHOD OF ROBUST TIMING DETECTION AND CARRIER FREQUENCY OFFSET ESTIMATION FOR OFDM SYSTEMS

FIELD OF THE INVENTION

The present invention relates generally to data communication, and more particularly, to data communication with transmission diversity using Orthogonal Frequency Division Multiplexing (OFDM) in multiple antenna channels.

BACKGROUND OF THE INVENTION

In wireless communication systems, antenna diversity plays an important role in increasing the system link robustness. OFDM is used as a modulation technique for transmitting digital data using radio frequency signals (RF). In OFDM, a radio signal is divided into multiple sub-signals that are transmitted simultaneously at different frequencies to a receiver. Each sub-signal travels within its own unique frequency range (sub-channel), which is modulated by the data. OFDM distributes the data over multiple channels, spaced apart at different frequencies. The receiver needs to first detect the start of the packet and the OFDM symbol boundary for the FFT operation. Improper timing detection results in missing packet or inter-symbol interference (ISI). The receiver also needs to estimate the carrier frequency offset (CFO) and compensate it using signal processing techniques. Large CFO reduces carrier orthogonality, and introduces inter-carrier interference which degrades the system performance dramatically.

Figure 1:
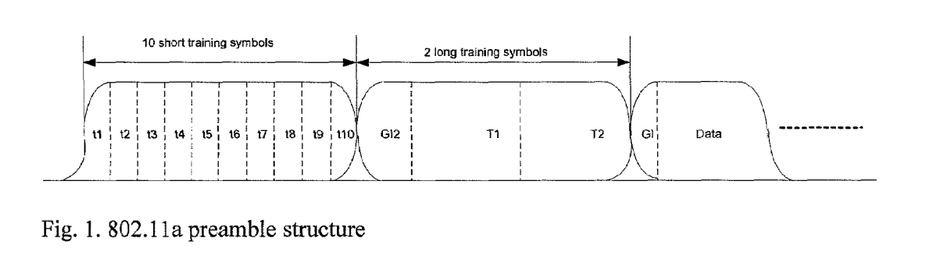
FIG. 1 shows an 802.11a preamble structure.

OFDM has been selected as the basis for the high speed wireless local area network (WLAN) standards by the 802.11a standardization group, and is also being considered as the basis for the high throughput WLAN 802.11n. As shown in FIG. 1, the packet preamble specified by the IEEE 802.11a standard consists of ten identical short training symbols (each containing 16 data samples) and two identical long training symbols (each containing 64 data samples). The short preamble (including the short training symbols) is used for timing detection and coarse frequency synchronization.

Figure 2:
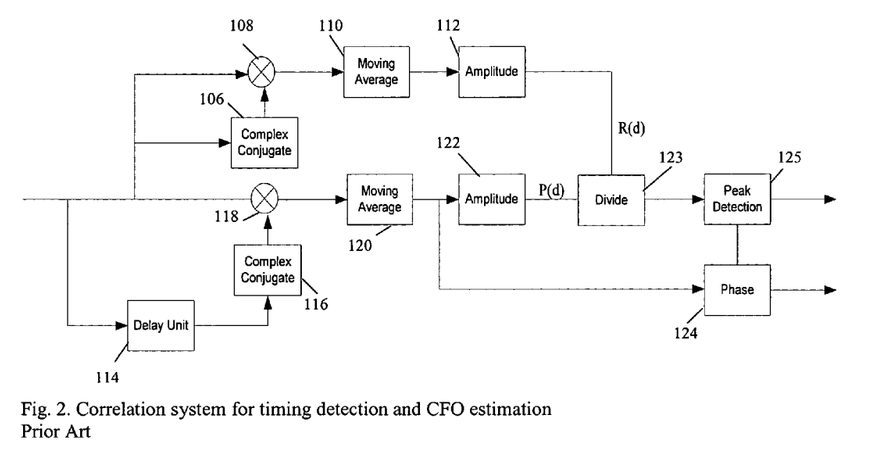
FIG. 2 shows a conventional correlation system for timing detection and CFO estimation.

FIG. 2 shows a block diagram of a conventional correlation system for timing detection and coarse carrier frequency offset (CFO) estimation. The correlation system attempts to find the maximum/peak of the timing metric M(d) given by $$M(d) = \frac{|P(d)|^2}{R^2(d)}$$

where d is a time index and $$P(d) = \sum_{m=0}^{L-1} r(d+m) \cdot r^*(d+m+L) \text{ and } R(d) = \sum_{m=0}^{L-1} |r(d+m)|^2,$$

such that L=16 for the short preamble. Here, r(d) is the received time domain signal; m is a dummy variable for the summation; P(d) is the correlation result of the received signal r(d) with its delayed version r(d+L); R(d) is the auto-correlation result of the received signal r(d) itself; and L=16 is the number of data samples defined by the 802.11a standard short preamble.

The timing metric M(d) reaches a plateau which leads to some uncertainty as to the start of a packet frame. In addition, because L=16 is the same as the cyclic prefix in the OFDM symbol, peak detection of the timing metric sometimes provides wrong frame boundary. Other methods attempt to reduce the ambiguity due to the timing metric plateau. However, the false peak caused by the cyclic prefix (CP) still exists.

There is, therefore, a need for a new robust and accurate algorithm for timing detection and CFO estimation using the short preamble.

BRIEF SUMMARY OF THE INVENTION

The present invention addresses the above needs. In one embodiment the present invention provides a symbol detection method for an OFDM receiver, including the steps of determining the correlation of corresponding samples of at least two received preamble symbol samples, one the samples delayed a predetermined duration with respect to the other; determining a timing metric based on the correlation results; detecting multiple peaks in the timing metric; and indicating a symbol detection based on the multiple peaks detected in the timing metric.

Symbol detection is indicated when the number of continuous peaks detected is greater than a predetermined value. Detecting multiple peaks in the timing metric further includes the steps of comparing the timing metric to a threshold value, and indicating a peak detection when the timing metric is greater than the threshold value.

Preferably, the step of detecting multiple peaks in the timing metric further includes the steps of comparing the timing metric to a threshold value; indicating a peak detection when the timing metric is greater than the threshold value; and counting the number of peaks detected in sequence; wherein symbol detection is indicated based on the count of continuous peaks detected such that symbol detection is indicated when the count of peaks detected is greater than a predetermined value, whereby false peak detection caused by the cyclic prefix (CP) correlation is minimized.

In another embodiment, the symbol detection method further includes the steps of determining carrier frequency offset (CFO) estimation by averaging the phase of the correlation results across the multiple peaks detected to reduce variance of CFO estimation error.

As such, the present invention provides a new robust and accurate algorithm for timing detection and CFO estimation using the short preamble.

In another aspect the present invention provides a detection system which implements the detection method of the present invention.

These and other features, aspects and advantages of the present invention will become understood with reference to the following description, appended claims and accompanying figures.

BRIEF DESCRIPTION OF THE DRAWINGS

Like components have like reference numbers.

DETAILED DESCRIPTION OF THE INVENTION

OFDM is used as a modulation technique for transmitting digital data using radio frequency signals (RF) over multiple antennas, wherein antenna diversity increases system link robustness. A radio signal is divided into multiple sub-signals that are transmitted simultaneously at different frequencies to a receiver. The data is distributed over multiple channels, spaced apart at different frequencies.

Typically, an OFDM receiver comprises an antenna, an RF demodulator, an Analog-to-Digital-Converter/Filter (ADC/Filter), an FFT block, a diversity combiner/decoder and a sub-channel demodulator. The received OFDM signals are converted from time-domain data to frequency-domain data by the FFT blocks, where FFT is performed on each symbol to convert the time-domain into frequency-domain. The frequency-domain data is then decoded by diversity combiner/decoder that examines the phase and amplitude of the sub-channels. The FFT process extracts the phase and amplitude of each received sub-channel from the received samples, and the diversity combiner provides receive diversity in the frequency domain. An OFDM packet based receiver comprises a synchronization function that receives the baseband OFDM signal and uses the preamble of the incoming packet to perform synchronization including symbol timing and carrier frequency offset estimation.

In an OFDM system, synchronization at the receiver requires finding data symbol timing and carrier frequency offset (CFO). There are many samples per OFDM symbol, proportional to the number of subcarriers. Finding the symbol timing for OFDM requires estimation of the symbol start. The CP makes the receiver more robust to multipath propagation. Proper synchronization of the carrier frequency at the receiver prevents loss of orthogonality between the subsymbols. OFDM systems are sensitive to carrier frequency offsets as they can only tolerate offsets which are a fraction of the spacing between the subcarriers without a large degradation in system performance.

In one embodiment, the present invention provides a detection method and system for OFDM symbol timing detection and coarse carrier frequency offset (CFO) estimation for OFDM systems that use 802.11a short preamble. Those skilled in the art will recognize that the present invention is also useful with, and can be configured to, other 802.11 protocols (e.g., 802.11g, 802.11n, etc.). For example, in 802.11g standard, similar short preamble structure is used. Therefore, the present invention can be used directly. In current 802.11n proposal, the short preamble either transmits through only one antenna, or transmits through multiple antennas with cyclic delay on different antennas. The present invention can be applied to both cases without performance degradation.

Figure 3:
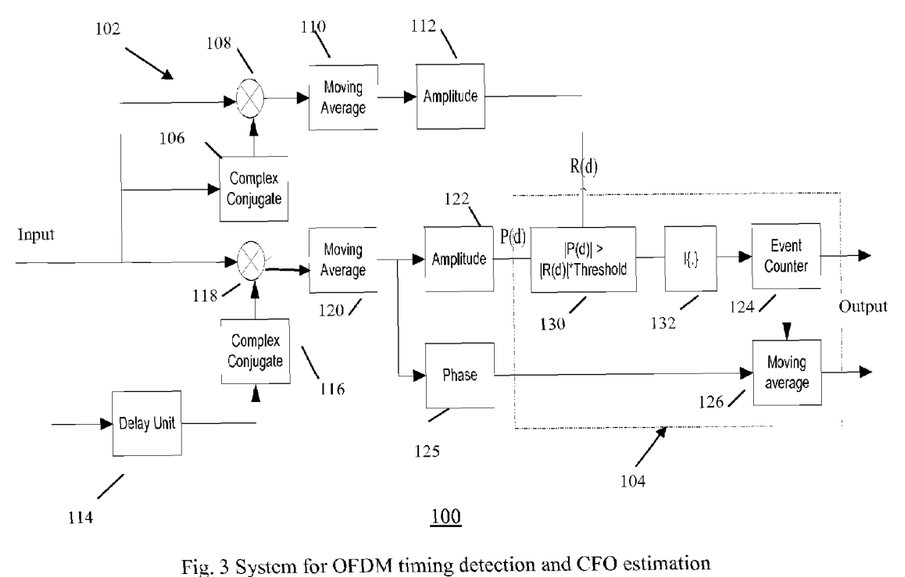
FIG. 3 shows an example block diagram of an embodiment of system for OFDM timing detection and CFO estimation, according to the present invention.

FIG. 3 shows a block diagram of an example detection system 100 that implements the detection method of the present invention, and improves on the convention system of FIG. 2. The system 100 in FIG. 3 utilizes: (i) new determination of timing metric M(d) based on P(d) and R(d) values, (ii) new symbol detection criteria, and (iii) a new process of computing the CFO, described below.

The detection system 100 comprises a correlation component 102 and a detection component 104 (shown in a dashed box in FIG. 3). The correlation component 102 determines the P(d) and R(d) values, and the detection component 104 provides the timing detection according to the present invention. An example calculation of the P(d) and R(d) values is described by T. M. Schmidl and D. C. Cox, "Robust frequency and timing synchronization for OFDM," IEEE Trans. on Comm., Vol. 45, No. 12, December 1997, pp. 1613-1621, incorporated herein by reference, and as such not repeated here in detail.

A signal is detected by measuring the amplitude of the correlation of incoming signals. Given two repeated training symbols that are identical to each other at the receiver except for a phase shift caused by the carrier frequency offset, if the conjugate of a sample from the first symbol is multiplied by the corresponding sample from the second (with delay), the effect of the channel should be cancelled and the products of each of these pairs of samples will have approximately the same phase. When the amplitude of this correlation value is larger than a detection threshold, the receiver is informed that a burst is arriving.

In one example, the R(d) values are determined by the correlation component 102 according to relation (1) below:

$$R(d) = \sum_{m=0}^{L-1} |r(d+m)|^2 \qquad (1)$$

wherein, d is a time index and in this example L=16 for short preamble. L is the length of one short training symbol. It is specified by the particular protocol standard application. In the 802.11a/g/n standard application, the short preamble contains 10 short training symbols; each short training symbol has 16 samples; r is the received signal; and m is dummy variable ranging from 0 to L−1. Threshold is a preset number that can be e.g. 0.7-0.85. One of the advantages of the present invention is that it is much less sensitive to the Threshold compared with the conventional peak detection methods.

Similarly, the P(d) values are determined by the correlation component 102 according to relation (2) below:

$$P(d) = \sum_{m=0}^{L-1} r(d+m) \cdot r^*(d+m+L). \qquad (2)$$

The input to the system in FIG. 3 is the received signal r. To determine the R(d) values according to relation (1) above, the correlation component 102 utilizes a Complex Conjugate 106, a Combiner 108 (multiplier) that combines the input values with the conjugate output of the Complex Conjugate 106, a Moving Average filter 110 that filters the output values from the Combiner 108 and an Amplitude Detector 112. The components 106, 108 and 110 form a convolver.

The Complex Conjugate 106 inputs the signal r, performs a complex conjugate function and outputs the conjugate of the received signal (i.e., conj(r)). The Combiner 108 multiplies the received signal r with the complex conjugate of the received signal r, outputting r*conj(r). The Moving Average filter 110 averages the values r*conj(r) to generate its output R(d). The Amplitude Detector 112 detects the amplitude of R(d) and outputs |R(d)|.

To determine the P(d) values according to relation (2) above, the correlation component 104 utilizes a Delay Unit 114, a Complex Conjugate 116, a Combiner 118 that combines the input values with the conjugate output of the Complex Conjugate 116, a Moving Average filter 120 that filters the output values from the Combiner 118 and an Amplitude Detector 122. The Delay Unit 114 provides an L unit delay on the received signal r, and outputs r(d+L) as the delayed version of the received signal r. The Complex Conjugate 116 performs a complex conjugate of r(d+L) and outputs conj(r (d+L)). The Combiner 118 multiplies r(d) and conj(r(d+L)), outputting r(d)*conj(r(d+L)). The Moving Average filter 120 averages r(d)*conj(r(d+L)), and outputs P(d). The Amplitude Detector 122 detects the amplitude of P(d) and outputs |P(d)|.

Determination of Timing Metric

As discussed, the system 100 in FIG. 3 is different from the conventional system in FIG. 2 at least in the detection component 104 which performs determination of the timing metric M(d) from the P(d) and R(d) values, and peak detection from the M(d) values. The system of FIG. 2 uses a peak detector 102 after the correlation process, wherein the peak detector 102 detects only one peak from the output (i.e., [|P(d)|$^2$/R$^2$(d)]) of the divider 123. However, because after the correlation process, there are multiple peaks, the conventional system in FIG. 2 cannot make an accurate peak detection. According to the example detection system 100 in FIG. 3, an Event Counter 124 is used to detect multiple peaks, wherein the timing detection is improved. Further, averaging of the multiple peaks in a Moving Average filter 126 (i.e., averaging over the plateau) improves accuracy of CFO estimation, and therefore packet detection.

In the example system 100 of FIG. 3, once the P(d) and R(d) values are calculated based on relations (1) and (2) above, the timing metric M(d) is determined in the detection component 104 as e.g. a Boolean value (e.g., 1 or 0), and computed according to relation (3) below:

$$M(d) = I\left(\frac{|P(d)^2|}{R^2(d)} > \text{Threshold}\right) \quad (3)$$

where I(.) is an indicator function such that if [|P(d)|$^2$/R$^2$(d)]>Threshold then M(d)=1, otherwise M(d)=0. In conventional systems, peak detection is very sensitive to the threshold. If the threshold is too high, there will be a lot of miss detection. If the threshold is too low, it will cause false alarm. In the present invention, the system performance is not very sensitive to the Threshold due to multiple peak detection. A small number, for example 0.7, works well across all channels.

To determine the M(d) values according to relation (3) above, the detection component 104 utilizes a Threshold Detector 130 which determines if [|P(d)|$^2$/R$^2$(d)]>Threshold in relation (3), and an Indicator 132 that performs the indicator function I(.) in relation (3) above.

Symbol Detection Criteria

The symbol detection criterion is changed from conventional detection of a maximum peak, to a peak detection window according to the present invention. In one example implementation of the detection window, the detection component 104 utilizes the Event Counter 124 to count the number of continuous (sequence) 1's in the M(d), wherein reaching a predetermined count n (e.g., n=128) indicates a packet start.

The window length (e.g., 128) is determined by the short training sequence. The short training sequence has 10 repeated symbols; each has a length of 16. As such, the total length is 16*10. During correlation process, it will take 16 samples for the results to reach the maximum from 0, and another 16 samples to go down from maximum to 0. Therefore, the expected plateau width is 160−16−16=128. The window length varies with different training sequence lengths.

Figure 4:
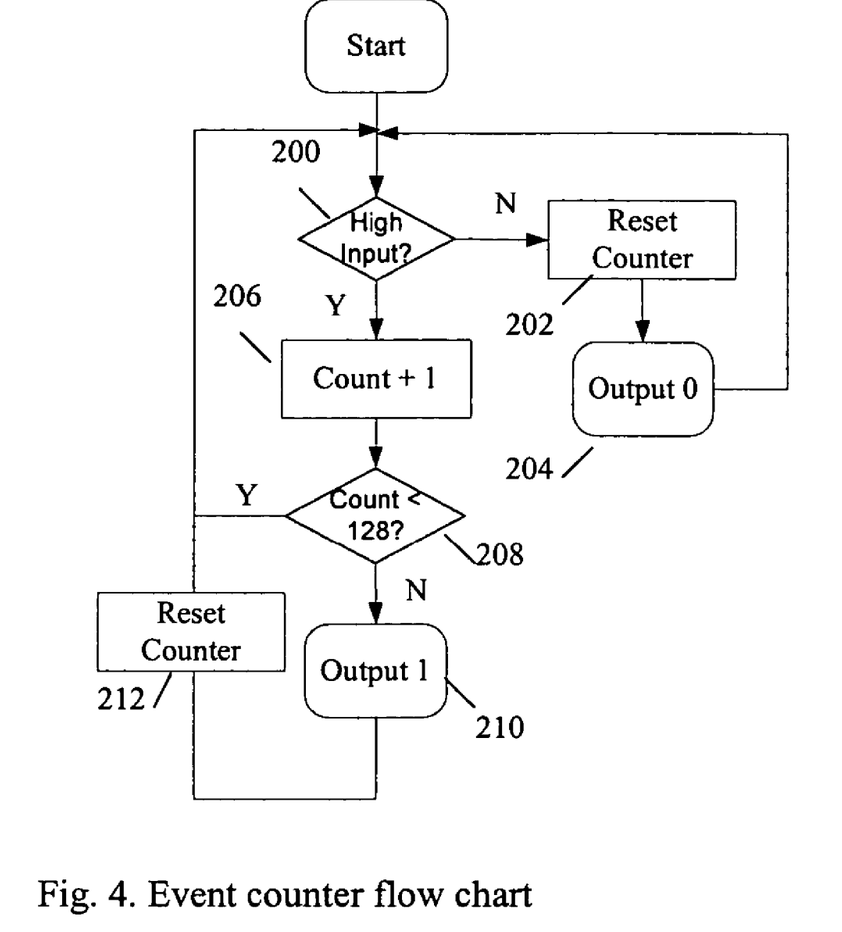
FIG. 4 shows an example flow chart of the steps implemented by an embodiment of the event counter of the system in FIG. 3.

FIG. 4 shows the flow chart of example steps which is implemented in the Event Counter 124 of FIG. 3. Referring to FIG. 4, initially a counter is initialized, and in step 200 it is determined if the input (i.e., M(d) output of Indicator 132 in FIG. 3) to the Event Counter 124 is a 1 (i.e., High Input). If the input is 0, then the counter is reset in step 202, the Event Counter 124 outputs a value of 0 in step 204, and waits for the next input value. However, if in step 200, it is determined that the input to the Event Counter 124 is a 1, then the counter is incremented by 1 in step 206, and it is then determined if the count in the counter has reached e.g. 128 (step 208). If the count has not reached 128, then the Event Counter 124 waits for the next input value. However, if the count has reached 128, then the Event Counter 124 outputs a value of 1 in step 210, resets the counter in step 212, and waits for the next input.

The Event Counter 124 in FIG. 3, detects a continuous peak as indicated by the 1xs in the M(d), such that when the continuous peak is greater than e.g. 128, it indicates detection of a plateau which is the start of a packet. If it not a continuous peak, then it is determined that the peak is caused by the cyclic prefix (CP) and not the preamble start of a packet, according to an embodiment of the present invention.

The output of the Event Counter 124 is also provided to the Moving Average filter 126 along with output of a Phase 125, which calculates the phase pf P(d). The output of the Event Counter 124, and the output of the Moving Average filter 126 (i.e., CFO estimation) are provided as outputs of the detection system 100 of FIG. 3 for further processing. The output of the Event Counter 124 determines the OFDM symbol boundary. The receiver RX will start from this point, count every 4.0us as one OFDM symbol, and perform the corresponding operation such as FFT, etc. The output of the Moving Average filter 126 is the estimated CFO that can be used in the following frequency offset compensation model.

In this way, the false peak caused by the cyclic prefix (CP) correlation output is essentially eliminated or minimized according to the present invention. Further, the Threshold value in relation (3) above is not sensitive to the channel statistics. The Threshold is not very critical because of window detection in the present invention, instead of peak detection. Any false peak detection will not generate a wrong decision because it cannot pass window detection. Since wireless channel varies from location to location, from time to time, a robust solution according to the present invention is very important for system reliability.

Figure 5A:
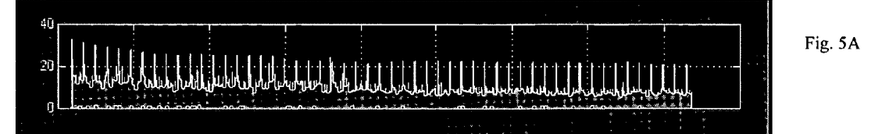
FIG. 5A is an example plot of the values |R(d)| in the system of FIG. 3.
Figure 5B:
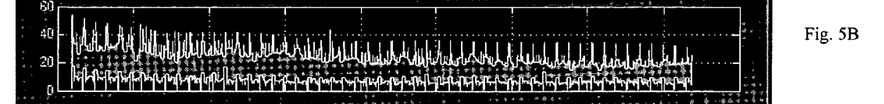
FIG. 5B is an example plot of the values |P(d)| in the system of FIG. 3.
Figure 5C:
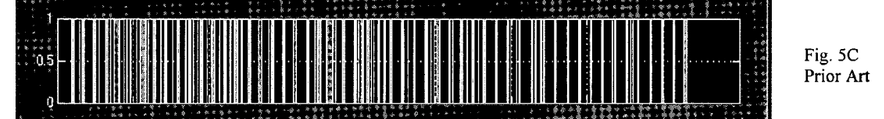
FIG. 5C is an example plot of the detection output of the conventional approach.
Figure 5D:
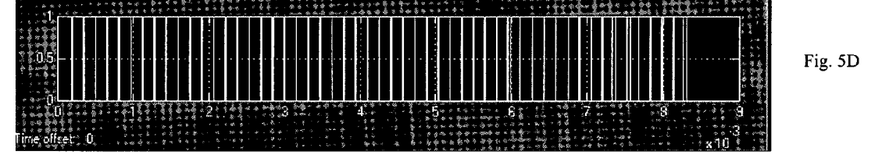
FIG. 5D is an example plot of detection output of the system of FIG. 3 according to the present invention.

FIGS. 5A-D shows example detection results using an example window detection system such as that in FIG. 3. As the result in FIGS. 5D shows, inventors have found that in relation (3) above, setting the Threshold value between e.g. 0.7-0.85 is preferable. The present invention allows accurate peak detection in a variety of channels and with a variety of threshold values.

FIG. 5A is an example plot of the values |R(d)|, FIG. 5B is an example plot of the corresponding values |P(d)|, FIG. 5C is an example plot of the detection output of the conventional approach using said |R(d)| and |P(d)| values, and FIG. 5D is an example plot of detection output using said |R(d)| and |P(d)| values, according to the example system 100 of the present invention shown in FIG. 3. In FIGS. 5A-D, the horizontal axis represents time in seconds.

Comparing the results in FIG. 5C and FIG. 5D, it is clear that the conventional approach generates many false peak detection results (i.e., rising edges in the output shown in FIG. 5C compared to that in FIG. 5D) caused by the cyclic prefix. The output in FIG. 5D indicates a more robust solution than that in FIG. 5C. First, the short training symbol has exactly the same length as the CP, i.e., 16. When correlation with the delayed received signal is performed, a peak in the CP is detected just as the short training sequence. Second, in FIG. 5C peak detection is very sensitive to the channel. It is very difficult to find the optimal number that works for all cases. Third, by doing window detection instead of peak detection, the present invention provides multiple samples which statistically produce better estimation.

Simulation results have shown that packet mis-detection in a detection system 100 according to the present invention is minimal or nonexistent compared to the conventional approach. The peaks are properly detected at the beginning of each packet. In the system 100 of the present invention, because the short preamble has the same length as the cyclic prefix, when convolution is performed cyclic prefix also provides a peak. This improves packet detection.

Coarse Carrier Frequency Offset Estimation

Further, the coarse carrier frequency offset estimation can be improved by averaging the phase of the correlation output across above-mentioned plateau. P(d) is a complex number. The amplitude is used to detect the start of the packet, and the phase is the CFO. As such, there is multiple phase information for the multiple peaks, average value of the phase is calculated. In this manner, the coarse variance of CFO estimation error is reduced to e.g. $10^{-6}$ (slightly larger memory may be needed to store the required information).

The present invention has been described in considerable detail with reference to certain preferred versions thereof; however, other versions are possible. Therefore, the spirit and scope of the appended claims should not be limited to the description of the preferred versions contained herein.

What is claimed is:

1. A symbol detection method for an Orthogonal Frequency Division Multiplexing (OFDM) receiver, comprising the steps of:
    determining a correlation of corresponding samples of at least two preamble symbol samples received in the OFDM receiver, one of the samples delayed by a predetermined duration with respect to another;
    determining a timing metric based on the correlation;
    detecting multiple continuous peaks in the timing metric; and
    indicating a symbol detection based on the multiple continuous peaks detected in the timing metric, the multiple continuous peak detection comprising:
        comparing the timing metric to a threshold value;
        indicating a peak detection when the timing metric is greater than the threshold value;
        counting a number of continuous peaks detected; and
        indicating a symbol detection based on a predetermined number of continuous peaks detected,
        wherein the continuous peak detection predetermined number is determined by a preamble short training sequence.

2. The method of claim 1 wherein the symbol detection is indicated when the number of peaks detected is greater than a predetermined value.

3. The method of claim 2 wherein the predetermined value is a function of a length of a preamble symbol.

4. The method of claim 1 wherein the step of indicating a symbol detection further comprises:
    indicating a symbol detection based on the count of the multiple continuous peaks.

5. The method of claim 1 wherein the step of detecting multiple peaks in the timing metric comprises:
    comparing the timing metric with a threshold value and indicating a peak detection when the timing metric is greater than the threshold value.

6. The method of claim 5 wherein the threshold value is between about 0.7 and 0.85.

7. The method of claim 1 wherein the step of detecting multiple peaks in the timing metric further comprises:
    wherein symbol detection is indicated when the number of peaks detected is greater than a predetermined value.

8. The method of claim 1 wherein symbol detection is indicated when the number of peaks detected is greater than a predetermined value.

9. The method of claim 1 wherein symbol detection is indicated when the number of peaks detected is greater than a predetermined value, whereby false peak detection caused by a cyclic prefix (CP) correlation is minimized.

10. The method of claim 1 further including the steps of determining carrier frequency offset (CFO) estimation by averaging a phase of the correlation across the multiple peaks detected.

11. The method of claim 1 further including the steps of determining carrier frequency offset (CFO) estimation by averaging a phase of the correlation across the multiple peaks detected to reduce coarse variance of CFO estimation error.

12. The method of claim 1 wherein symbol detection is performed using a peak detection window and is based on the number of multiple continuous peaks in the timing metric.

13. A symbol detection system for an Orthogonal Frequency Division Multiplexing (OFDM) receiver, comprising:
    a correlator that determines a correlation of corresponding samples of at least two preamble symbol samples received in the OFDM receiver, one of the samples delayed by a predetermined duration with respect to another, and determines a timing metric based on the correlation; and
    a detector that detects multiple continuous peaks in the timing metric, and indicates a symbol detection based on the multiple continuous peaks detected in the timing metric, the detector detects multiple continuous peaks in the timing metric by:
        comparing the timing metric with a threshold value;
        indicating a peak detection when the timing metric is greater than the threshold value;
        counting a number of continuous peaks detected; and
        indicating a symbol detection based on a predetermined number of continuous peaks detected,
        wherein the continuous peak detection predetermined number is determined by a preamble short training sequence.

14. The system of claim 13 wherein symbol detection is indicated when the number of multiple continuous peaks detected is greater than a predetermined value.

15. The system of claim 14 wherein the predetermined value is a function of a length of a preamble symbol.

16. The system of claim 13 wherein the detector counts multiple continuous peaks and indicates a symbol detection based on the count of multiple continuous peaks.

17. The system of claim 13 wherein the detector further compares the timing metric with a threshold value, and indicates a peak detection when the timing metric is greater than the threshold value.

18. The system of claim 17 wherein the threshold value is between about 0.7 and 0.85.

19. The system of claim 13 wherein the detector detects multiple continuous peaks in the timing metric further includes:
wherein symbol detection is indicated when the number of multiple continuous peaks detected is greater than a predetermined value.

20. The system of claim 13 wherein symbol detection is indicated when the number of peaks detected is greater than a predetermined value.

21. The system of claim 13 wherein symbol detection is indicated when the number of peaks detected is greater than a predetermined value, whereby false peak detection caused by a cyclic prefix (CP) correlation is minimized.

22. The system of claim 13 wherein the detector further determines carrier frequency offset (CFO) estimation by averaging a phase of the correlation across the multiple peaks detected.

23. The system of claim 13 wherein the detector further determines carrier frequency offset (CFO) estimation by averaging a phase of the correlation across the multiple continuous peaks detected to reduce coarse variance of CFO estimation error.

* * * * *